No. 820,760. PATENTED MAY 15, 1906.
J. H. BLEOO.
VALVE FOR AIR BRAKE SYSTEMS.
APPLICATION FILED JAN. 9, 1904. RENEWED FEB. 14, 1906.
2 SHEETS—SHEET 1.
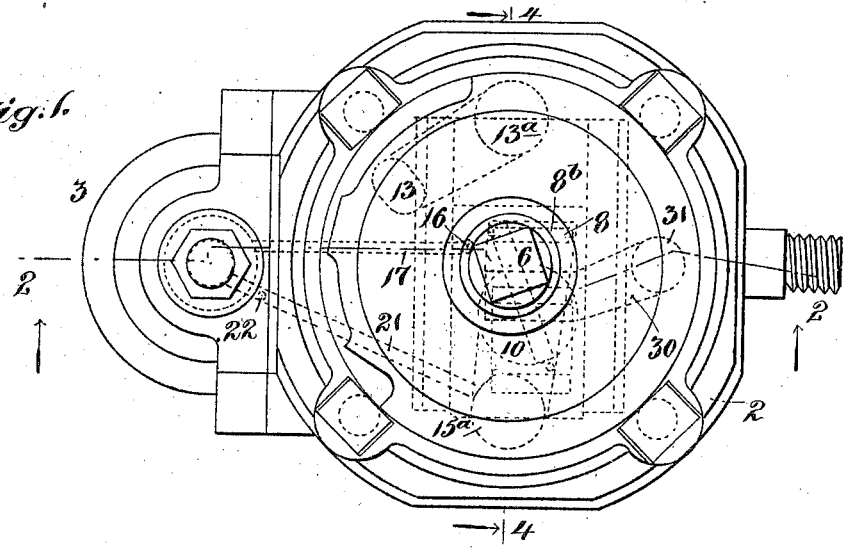

No. 820,760. PATENTED MAY 15, 1906.
J. H. BLEOO.
VALVE FOR AIR BRAKE SYSTEMS.
APPLICATION FILED JAN. 9, 1904. RENEWED FEB. 14, 1906.
2 SHEETS—SHEET 2.
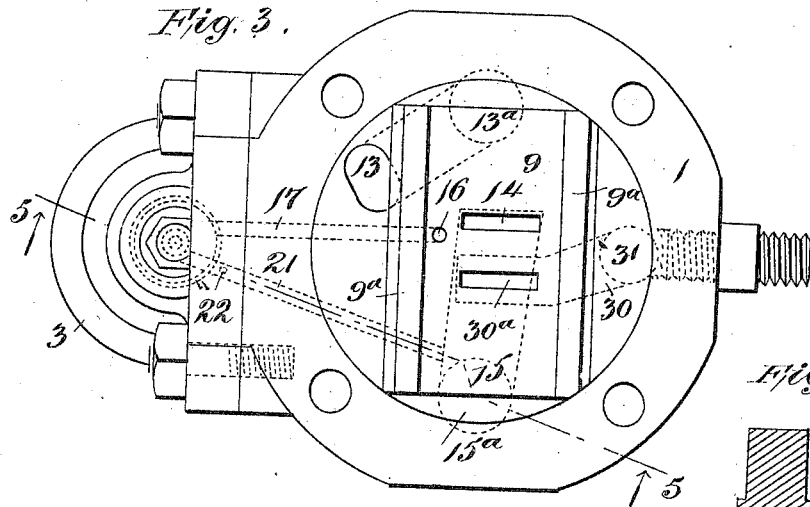
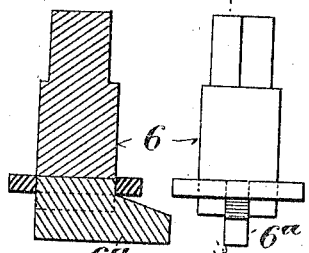
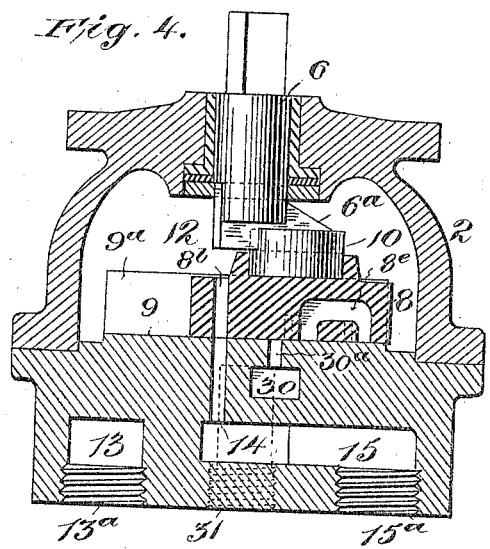
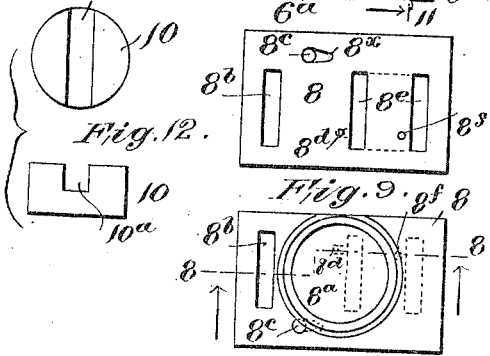
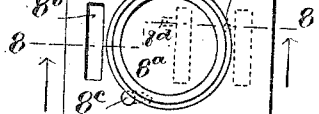
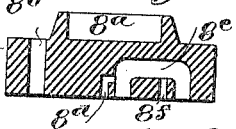
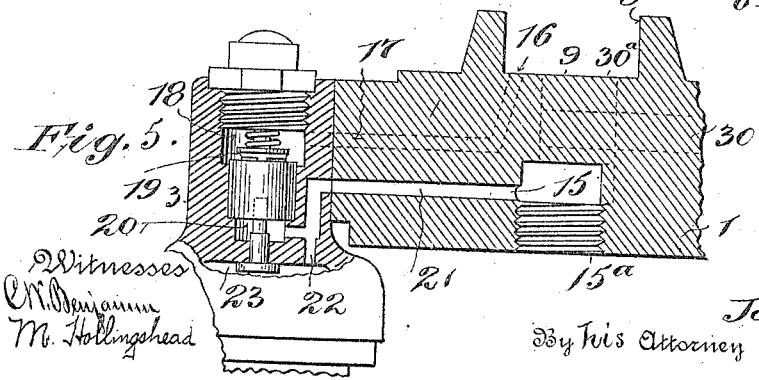

UNITED STATES PATENT OFFICE.

JOHN H. BLEOO, OF NEW YORK, N. Y., ASSIGNOR TO ABRAHAM B. LEVY, OF NEW YORK, N. Y.

VALVE FOR AIR-BRAKE SYSTEMS.

No. 820,760.   Specification of Letters Patent.   Patented May 15, 1906.

Application filed January 9, 1904. Renewed February 14, 1906. Serial No. 301,044.

*To all whom it may concern:*

Be it known that I, JOHN H. BLEOO, a citizen of the United States, residing in New York city, borough of Brooklyn, New York, have invented certain new and useful Improvements in Valves for Air-Brake Systems, of which the following is a specification.

My invention relates to improvements in controlling-valves for air-brake systems, commonly called "engineers' brake-valves;" and the invention has for its objects to permit reduction of air-pressure to be made direct from a train-pipe without requiring the use of an equalizing-valve and reservoir, to permit recharging of the system with air while the valve-handle is in position to hold the brake set by utilizing the ports and passages that are used in the "running" position and without using any special port or ports for the purpose, to permit recharging the train-pipe through a feed-valve while the brakes are applied, and to provide improved means for operating a slide-valve that controls the air in the main valve.

My invention comprises the novel details of improvements that will be more fully hereinafter set forth and then pointed out in the claims.

Reference is to be had to the accompanying drawings, forming part hereof, wherein—

Figure 1 is a plan view of a valve embodying my invention. Fig. 2 is a section on the plane of the line 2 2 in Fig. 1. Fig. 3 is a plan view, the top member of the valve-casing being removed. Fig. 4 is a cross-section on the plane of the line 4 4 in Fig. 1. Fig. 5 is a vertical section on the plane of the line 5 5 in Fig. 3. Fig. 6 is a cross-section on the line 6 6 in Fig. 2. Fig. 7 is a plan view of the slide-valve. Fig. 8 is a section thereof on the line 8 8 in Fig. 7. Fig. 9 is a face view of the lower side of the valve shown in Fig. 7. Fig. 10 is a detail of the shaft of the engineer's handle or lever for controlling the valve of Fig. 7. Fig. 11 is a section thereof on the line 11 11 in Fig. 10, and Fig. 12 is a view showing details of the rotative disk for operating the valve of Fig. 7 by the engineer's lever and its shaft.

Similar numerals of reference indicate corresponding parts in the several views.

The main casing of the valve is shown composed of two members 1 and 2, secured together by screws or otherwise, and at 3 4 5 are indicated the members or casing of a feed or pressure regulating valve for recharging the train-pipe at the desired air-pressure and which is shown attached to the member 1. The member 2 is provided with bearings for a shaft 6, having a handle or lever 7 for controlling a slide-valve 8. The member 1 has a valve-seat 9 for the valve 8, and at $9^a$ are walls between which the valve 8 is guided to slide upon the seat 9. In the construction shown the valve 8 has a circular recess $8^a$ in its top, in which is journaled a disk 10, that is shown provided with a slot $10^a$ on its upper surface, in which slot fits a tongue, foot, or wing $6^a$, projecting from shaft 6 for reciprocating the slide-valve as the shaft turns back and forth.

As shown in Fig. 7, the recess $8^a$ is disposed eccentrically with respect to the central longitudinal line of slide-valve 8, and the arrangement is such that when shaft 6 is turned on its axis the disk 10 will rotate in the recess $8^a$, and as the foot or wing $6^a$ extends beyond the shaft 6 it will be undertood that as the shaft turns it will cause the valve 8 to slide in its bearings along the seat 9, the disk 10 turning in the recess $8^a$ to permit such sliding, while the foot or wing $6^a$ has freedom to slide in the slot $10^a$ of the disk. Thus the rotary motion of shaft 6 imparts reciprocating motion to the valve 8.

Within the casing is a chamber 12, which receives main-reservoir air that enters through a cored-out passage 13 in member 1, which passage is to be connected with a reservoir, as at $13^a$, and opens into chamber 12. From the slide-valve seat 9 a port 14 leads to a passage 15 in member 1, that connects at $15^a$ with a train-pipe, and the slide-valve 8 has a port $8^b$, adapted to register with port 14, (see Fig. 4,) whereby when the valve 8 is in such position free flow of main-reservoir air through 13, 12, $8^b$, 14, and 15 cause the brakes of a car or train connected with the valve to be released, the handle 7 then being in the full-release position.

In the running position air is supplied for the system through the feed-valve 3 4 5 when the handle 7 is moved to such position by the following means: In the slide-valve 8 is a port $8^c$, that is adapted to register with a port 16, that communicates by a passage 17 in member 1 with a chamber 18 in the feed-valve member 3. (See Fig. 2.) The chamber 18 has a valve 19, that controls the flow of air to a chamber 20 in member 3, which communicates by a cored-out passage 21 (see Fig. 5) with the passage 15. Thus while slide-valve 8 is in the running position port 8ᶜ will register with port 16 and main-reservoir air will flow from chamber 12 through 17 to chamber 18, past valve 19, to chamber 20, and thence through 21 to passage 15 to the train-pipe. The air from chamber 20 or passage 21 also communicates by a small port 22 with a diaphragm-chamber 23 (shown between members 3 and 4 of the feed-valve) to counterbalance the upward pressure of spring 24 against diaphragm 26 until the air-pressure in the system reaches a predetermined point below main-reservoir pressure.

As shown in Fig. 2, the spring 24 of the feed-valve acts to press plunger 25 against diaphragm 26, and thus against the air-pressure in chamber 23. At 27 is indicated a pin guided to travel freely in a bearing in member 3, and said pin is adapted to bear at one end against valve 19 and at the other end against diaphragm 26, whereby spring 24 serves through said pin to normally raise valve 19 from its seat against the downward pressure of spring 28 bearing on said valve. The valve 19 is shown guided in a bushing 19ᵃ in member 3, and, as shown, is adapted to fit upon a seat in said bushing. Pin 27 is fitted very closely in its guide or bearing and has two or more circumferential friction-grooves 27ᵃ, which receive air, and thus serve as packing-rings in well-known manner and practically prevent the flow of air through the bearing or guide past such pin, and yet serve to hold the pin in positions to which it may be pushed. Pin 27 is not fastened to either the valve 19 or diaphragm 26 and is a little shorter than the distance from valve 19 to the diaphragm at the time that the valve is on its seat and the air-pressure has moved the diaphragm to its full downward travel and by means of the friction-grooves and the air therein and the equalized pressure in chambers 20 and 23 will remain suspended or in positions set until forced up by the diaphragm 26 or down by the feed-valve 19. Air may enter the space between valve 19 and pin 27.

The effect of the arrangements above described is as follows: When handle 7 is moved to the running position and port 8ᶜ of the slide-valve 8 is brought in register with port 16, air will flow freely through passage 17 into chamber 18 past valve 19 (which is now held up by spring 24) into chamber 20, and thence through passages 21 and 15 to the train-pipe and also into chamber 23 upon diaphragm 26. When the pressure in chamber 23 and train-pipe has reached a predetermined point—say seventy pounds to the square inch—the regulating-piston 25 will be forced downward against spring 24 by the pressure in chamber 23, thus allowing diaphragm-pin 27 to be forced downward by feed-valve 19 by reason of the excess pressure of reservoir-air in feed-valve chamber 18, passage 17, and slide-valve chamber 12, thus seating valve 19 and cutting off further pressure from the main reservoir to the system. As the pressure in chambers 20 and 23 is thus maintained at train-pipe pressure and as chamber 23 has one small inlet and no outlet, the rise and fall of diaphragm 26 is positive with respect to the rise and fall of train-pipe pressure, the regulating-spring 24 being a constant. When the train-pipe pressure next falls, the feed-valve 19 will rise from its seat by reason of the pressure of spring 24 upon the diaphragm and the reduction of pressure in chamber 23, and when valve 19 thus rises from its seat—say one-sixteenth of an inch—it will give a relatively large area of opening, whereby train-pipe pressure will be quickly restored, and then valve 19 will be closed by the excess pressure from the main reservoir upon its top and by reason of the descent of the diaphragm caused by the increase of train-pipe pressure in chamber 23. Train-pipe pressure is thus maintained while the valve 8 is in the running position.

For service application of the brakes the following arrangements are provided: In member 1 is a passage 30, that communicates with the atmosphere, as at 31, and also communicates by a port 30ᵃ with slide-valve seat 9. Slide-valve 8 has a relatively small port 8ᵈ, that communicates with a cavity 8ᵉ, (the latter communicating at two points with the under surface of the valve,) that in the service position is adapted to communicate with port 14 in slide-valve seat 9, and valve 8 also has a small port 8ᶠ communicating with cavity 8ᵉ and adapted in service position to register with port 30ᵃ. When handle 7 and the slide-valve 8 are adjusted to service position, air in small volume will be vented to the atmosphere from the train-pipe connecting at 15ᵃ, through port 14, valve-port 8ᵈ, cavity 8ᵉ, and port 8ᶠ, port 30ᵃ, and passage 30 to atmosphere at 31, thus applying the brakes gently.

When handle 7 is moved to the "lap" position, slide-valve 8 is adjusted so that all ports are lapped or blanked except those of the running position, and my invention is designed to recharge the system while the handle 7 is in such position that the brakes may be held set or applied after service application for any desired length of time, the position I have selected for this purpose being what is commonly called the "lap" position of the handle because all usual ports are then blanked, and whereby, owing to the recharging of the system while the brakes are thus applied, the system is maintained ready at all times for a further service application without requiring the handle 7 to first be moved to full-release position, then to running position to recharge the system, and then back to service position. To accomplish this recharging of the system while the brakes are held set or applied, as while the handle 7 is in lap position, I extend or elongate the port 8$^c$ on that face of the slide-valve 8 which slides upon the seat 9 to one side of the main part of the port and to a reduced extent, as indicated at 8$^\times$ in Fig. 9. This elongation of port 8$^c$ of the slide-valve provides such a relation between the other ports of said valve that when handle 7 is moved to blank the other ports, as to lap position, the valve 8 will be so adjusted that all its ports will be blanked or lapped except that the elongated and reduced part 8$^\times$ of port 8$^c$ will register with a small part of port 16 in seat 9. In such position of the slide-valve (while all other slide-valve ports are blanked) air will flow from main air-chamber 12 in relatively small volume, through port 8$^c$ in top of slide-valve, to and through port 16 and passage 17 to feed-valve chamber 18, past valve 19 to chamber 20, through passages 21 and 15, to train-pipe at 15$^a$, thereby recharging the system to, say, seventy pounds to the square inch, whereupon the feed-valve 19 will close, as before explained, and stop further rise of pressure in the train-pipe, the brakes remaining set and the slide-valve in lap position, or the position for blanking all other ports. The advantages of this arrangement will be obvious, as the engineer will know, without any signals, that while the handle is in lap position the brakes are held applied and that the system is being recharged while the brakes are applied, so as to be ready for a further service application, if required, and whereby any leakage of air that might occur, such as in the well-known air-brake systems, while the brakes are applied for a relatively long space of time is overcome by the recharging of the system at such time.

For an emergency application the handle 7 is moved to the emergency position, which will move the slide-valve 8 to such position as to bring the end portions or ports of its cavity 8$^e$ in register simultaneously with ports 14 and 30$^a$ of seat 9, thereby permitting a great volume of air to flow from the train-pipe, through passage 15, port 14, slide-valve cavity 8$^e$, port 30$^a$, and passage 30, to the atmosphere at 31, whereby the brakes will be set quickly and with great force.

I have used the term "lap position" in this specification as signifying the usual position of the handle 7 as one space or notch from the service position of the handle; but I intend said term to include also such position of the slide-valve as causes the usual ports to be blanked while the brakes are held set or applied.

Modifications may be made in the details of arrangement shown and described without departing from the spirit of my invention.

I do not in this application separately claim the subject-matter of the feed-valve, as that is the subject-matter of my application filed April 4, 1904, Serial No. 201,382.

Having now described my invention, what I claim is—

1. An air-brake valve provided with ports and passages, one of which serves for supplying air for the running position, and a movable valve having ports for controlling the first-named ports and passages, one of the ports of said movable valve being arranged for supplying air therethrough to one of the first-named ports for the running position and also arranged to supply air to the last-named port for recharging the system while all other ports and passages are blanked, substantially as described.

2. An air-brake valve provided with ports and passages communicating with a valve-seat, one of said ports serving to supply air for the running position, and a slide-valve on said seat provided with ports for use in connection with the ports of said seat, one of the ports of the slide-valve being arranged to register with one of the ports of the seat for the running position, said port of the slide-valve being arranged with relation to the other ports of the seat so as to register with the port thereof adapted for the running position while all other ports of the seat are blanked to cause recharging of the system while the last-named ports are blanked, substantially as described.

3. An air-brake valve provided with ports and passages communicating with a valve-seat, one of said ports serving to supply air for the running position, and a slide-valve on said seat provided with ports for use in connection with the ports of said seat, one of the ports of the slide-valve being arranged to register with one of the ports of the seat for the running position, said port of the slide-valve being elongated with relation to the other ports thereof so as to register with the port of the seat adapted for the running position while all other ports of the seat are blanked to cause recharge of the system while the last-named ports are blanked, substantially as described.

4. An air-brake valve provided with ports and passages and a feed-valve communicating with certain of said passages and with the train-pipes, and a valve having ports to coact with the first-named ports and passages and one of its ports arranged to supply air to the feed-valve for the running position and also while the brakes are applied, substantially as described.

5. An air-brake valve provided with ports and passages and a valve to control the same, combined with a feed-valve connected with certain of said passages and with a train-pipe, and a slide-valve having ports, one of said ports being arranged to register with a passage leading to the feed-valve for the running position and also to communicate with said passage when the valve is in position for blanking all other ports for causing recharging of the system while the valve is in such position, substantially as described.

6. An air-brake valve provided with a feed-valve having a chamber to receive main-reservoir air, a valve and port to control the admission of air to said chamber, the feed-valve having another chamber to receive reservoir-air and maintained constantly under train-pipe pressure and not in communication with the main air-chamber of the valve except through the feed-valve and its supply-passage, substantially as described.

7. An air-brake valve having a main air-chamber and a passage communicating therewith, and a valve to control said passage, combined with a feed-valve casing provided with a chamber communicating with said passage and having a valve to control the exit of air from said chamber, said casing having another chamber communicating with the first-named chamber and in direct communication at all times with train-pipe air but having no connection with reservoir-air independent of the feed-valve, substantially as described.

8. An air-brake valve provided with ports and passages and a valve to control the same, combined with a feed-valve provided with a chamber communicating with one of said passages to receive main-reservoir air, a diaphragm-chamber communicating with the first-named chamber on the air-delivery side of the valve and with a passage connected with train-pipe air, whereby the diaphragm-chamber is maintained under train-pipe pressure and whereby the feed-valve prevents reservoir-pressure from reaching the diaphragm-chamber, a spring to act with the diaphragm, and a connection between the feed-valve and the diaphragm for opening the former by the influence of said spring, substantially as described.

9. An air-brake valve provided with passages and a valve to control the same combined with a feed-valve provided with a chamber in communication with one of said passages and a chamber communicating with train-pipe air and having no connection with main-reservoir air except as it is delivered past the feed-valve, and means for causing the feed-valve to close upon pressure in the train-pipe and the second-named chamber reaching a predetermined point and for causing the feed-valve to open upon reduction in train-pipe pressure to permit recharging of the train-pipe with air from the main reservoir, substantially as described.

10. An air-brake valve provided with passages and a valve to control the same, combined with a feed-valve casing provided with a chamber communicating with one of said passages, a valve to control the outlet from said chamber, a chamber communicating with the first-named chamber and with a passage for connection with a train-pipe, a diaphragm on one side of the second-named chamber, a spring to push the diaphragm against pressure in the train-pipe and a pin between the diaphragm and the feed-valve for opening the latter upon reduction of train-pipe pressure in the diaphragm-chamber, the spring and diaphragm being arranged to permit the feed-valve to close by reason of main-reservoir pressure upon the train-pipe pressure reaching a predetermined point, substantially as described.

11. An air-brake valve provided with ports and passages and a valve to control the same, combined with a feed-valve casing having a valve and a diaphragm, and a pin fitting snugly in its guide or bearing and provided with a plurality of friction-grooves to receive air to retain the pin in different positions of adjustment and arranged to be practically tight to prevent the flow of air past the pin, said pin being independent of the diaphragm and feed-valve so that either may move without moving the pin, substantially as described.

12. The combination of a slide-valve provided with a recess or bearing, a disk journaled therein, and a shaft movably connected with said disk so that the disk may be rotated by the shaft and have independent movement relative to the axis of the shaft, substantially as described.

13. The combination of a slide-valve provided with a bearing and a disk journaled therein, with a shaft connected with the disk to rotate the same, said shaft also having sliding connection with the disk to permit the disk to move relatively to the axis of the shaft, substantially as described.

14. The combination of a slide-valve and a disk journaled thereon, with a shaft, and a tongue-and-slot connection between the shaft and disk, whereby the disk may be rotated by the shaft and have movement relative to the axis of the shaft, substantially as described.

15. The combination of a slide-valve and a disk journaled thereon and provided with a slot, with a shaft having a tongue or foot fitting in said slot and arranged to rotate the disk and permit sliding movement of the latter relative to the shaft, substantially as described.

JOHN H. BLEOO.

Witnesses:
T. F. BOURNE,
H. B. BRADBURY.